INVENTORS
HEINZ KUEHNE
MANFRED DIETZE &
FRANZ HAUER
BY
Bair, Freeman & Molinare
Attys.

INVENTORS
HEINZ KUEHNE
MANFRED DIETZE
& FRANZ HAUER

INVENTORS
HEINZ KUEHNE
MANFRED DIETZE
& FRANZ HAUER
BY
Bair, Freeman & Molinare
Attys.

INVENTORS
HEINZ KUEHNE
MANFRED DIETZE
BY & FRANZ HAUER

Bair, Freeman & Molinare
Attys.

INVENTORS
HEINZ KUEHNE
MANFRED DIETZE
& FRANZ HAUER

INVENTORS
HEINZ KUEHNE
MANFRED DIETZE &
FRANZ HAUER
BY
Bair, Freeman & Molinare
Attys.

United States Patent Office 3,499,873
Patented Mar. 10, 1970

3,499,873
**PREPARATION OF POLYETHYLENE TEREPH-
THALATE BY MEANS OF FREE FALLING
FILMS**
Heinz Kuehne, Oberhoechstadt, Taunus, Manfred Dietze,
Offenbach am Main, and Franz Hauer, Frankfurt am
Main, Germany, assignors to Vickers-Zimmer Aktien-
gesellschaft Planung und Bau von Industrieanlagen
Filed May 24, 1968, Ser. No. 731,754
Claims priority, application Germany, June 22, 1967,
V 33,924
Int. Cl. C08g 17/003
U.S. Cl. 260—75          10 Claims

ABSTRACT OF THE DISCLOSURE

An improved process for the manufacture of linear high polymers by the condensation of pre-condensates wherein the reacting material is repeatedly lifted and allowed to fall in the form of substantially coherent films under reaction conditions to expose large surface areas of said materials to the reaction conditions.

---

The invention relates to a process of, and apparatus for, manufacturing linear high polymers, more particularly for the further condensation of pre-condensates in the manufacture of polyesters, e.g. polyethylene terephthalate.

There are known continuous processes (German specification 1,207,349) for exposing a thin layer of a reacting polymer to the reaction conditions, but the ratio of the layer surface to the volume of reactant—a critical factor for the efficiency of the reaction—is limited by the surface area of the reactor used to support the layers. As these reactor surfaces are often heated metal walls, the layers in known processes have to be mechanically removed from the reactor surfaces at more or less regular intervals, so that the product does not become decomposed by the heat.

Discontinuous polycondensation processes are normally carried on in agitated autoclaves in which the reaction occurs in a thick layer of the product. Such a process requires a long reaction time, in addition to other disadvantages, because it is very difficult to remove the products of fission, e.g. gaseous ethylene glycol in the manufacture of polyethylene terephthalate, since the reacting mass is compact and has a low surface-to-volume ratio.

An object of the invention is to obviate the disadvantages of known polycondensation processes and more particularly to provide a polycondensation process with a large surface-to-volume ratio in which overheating due to excessive heat supply is completely eliminated and which is suitable for continuous and discontinuous manufacture of linear polycondensates.

Other objects of the invention can be gathered from a reading of the following disclosure.

According to one aspect of the present invention, there is provided a liquid polycondensation process for manufacturing linear high polymers, more particularly a process for the further condensation of pre-condensates during the manufacture of polyesters, wherein a thin layer of the reacting material is exposed to the conditions for the reaction. The process comprises passing the reacting material a number of times through a reaction chamber in freely-falling films or layers of particles. The freely-fall films are formed by lifting liquid reacting material from the bottom of the reaction chamber to a point near the top of the chamber and then allow the lifted material to fall freely. This process produces a very large surface compared with the volume of material, since the mist has two equally large surfaces which allow liberated substances to be completely evaporated and thus considerably shorten the residence time in the reaction chamber.

In a continuous mode of operation, this method has the advantage of shortening the time during which the material has to remain under the reaction conditions; the polycondensation apparatus can also be considerably reduced in size. In a discontinuous mode of operation, the number of batches passing through the polycondensation apparatus can be considerably increased because of the increased speed of the reaction.

A more complete reaction, as shown by the greater intrinsic viscosities of the product, can also be achieved by the present process than that by conventional discontinuous processes. As the falling films in the present process do not come into contact with heated metal walls, either in the continuous or discontinuous process, there is no danger of overheating and no need to remove the layer mechanically.

The process according to the invention is preferably worked in a polycondensation reactor comprising a chamber, means whereby the chamber can be heated, partition walls arranged at intervals inside the chamber to form a multiplicity of communicating reaction compartments extending axially of the chamber, a pre-condensate inlet at one end of the chamber, a product outlet at the other end of the chamber, a space for vapor above the partition walls and common to the reaction compartments, a conduit for conducting said space to a source of vacuum, and agitator elements in the compartments, the agitator elements being approximately perpendicular annular discs or rings fastened by spokes to a common agitator shaft system comprising a shaft, or shafts.

Annular disc agitators according to the invention continually lift the adhesive reacting product from the bottom of the reaction compartments. As the discs, or rings, rotate in the process according to the invention, the material runs down in mists which are constantly renewed from the substance at the bottom of the compartments. As a result, particles with different degrees of polycondensation are thoroughly mixed in each compartment; mixing occurs mainly at the bottom if the material has low dynamic viscosity, but occurs increasingly in the films as the dynamic viscosity increases.

It should be noted that the reacting material is lifted in a plane substantially perpendicular to the direction of travel of the material through the reaction chamber.

The peripheral speed or speed of rotation of the discs is adjusted to form a film, so that the force of gravity acting on the particles is greater than the sum of the centrifugal force and friction. It is therefore advisable to decrease the peripheral speed of the discs during the reaction, as the material increases in viscosity.

The invention will now be further described in detail with reference to the examples shown in the drawings, in which.

The main features of the polycondensation reactor according to the invention will now be described, first with reference to FIGURES 1 and 2. The horizontal container 1 preferably should be a double-walled cylinder with double-walled ends 2, 3. The space between the two container walls forms a heating jacket through which a suitable gaseous or liquid heat-exchanging medium, e.g. biphenyl, can flow. Heating can, however, be provided partly or completely by electric resistance band heaters passing around the outside of container 1, which need not have double walls if the heating is provided entirely by resistances. The heating can equally well be provided, in whole or part, by other known stationary heat radiators. The heating can also be arranged so that compartments are maintained at different temperatures—e.g., if a heating jacket is used in the manner shown, by having partition walls between the container walls, so as to form separate heating chambers. To facilitate assembly and maintenance, the container can be made of a number of sections, preferably fitted together by flanges.

The lower part of container 1 has stationary partition walls 4 which, in this embodiment, reach vertically up to the middle of the chamber. The pre-condensate inlet 5 terminates in the first reaction compartment, which is defined by the end wall 3 and the first partition wall, and product outlet 6 is connected to the last compartment, which is defined by the last partition wall and end wall 2. The agitator shaft system 7 is coaxial with the container and passes in vacuum-tight manner through end walls 2 and 3. The shaft system 7 is rotatably supported on stationary bearings 8 and 9 outside the container and is connected at one end 10 to a suitable rotating drive, e.g. an electric motor with a variable speed gear (not shown). Container 1 is stationary and supported by feet 11 (FIGURE 2) attached thereto. Above the partition walls 4 there is a vapor space 12 common to and communicating with all the reaction compartments and connected via sleeves to a conduit 13 leading to a source of vacuum. A discharge element, e.g. a worm (not shown) is preferably attached by flanges to the product outlet 6. The flow of material through the reactor is further described below.

Annular discs 14 are fastened to agitator shaft system 7, by means of hubs 15 and spokes 16, to rotate solidly with the shaft. In the embodiment shown in FIGURES 1 and 2, there is an annular disc 14 in each reaction compartment except the last. For continuous operation, it would be advantageous not to have an annular disc in the outlet compartment, because the reacting substance then occupies a fixed level in this compartment and can be used to adjust the residence time in the polycondensation reactor. With batch operation, on the other hand, it may be advantageous to provide an annular disc in the outlet compartment, so as to obtain a film in this compartment also.

Figure 3:
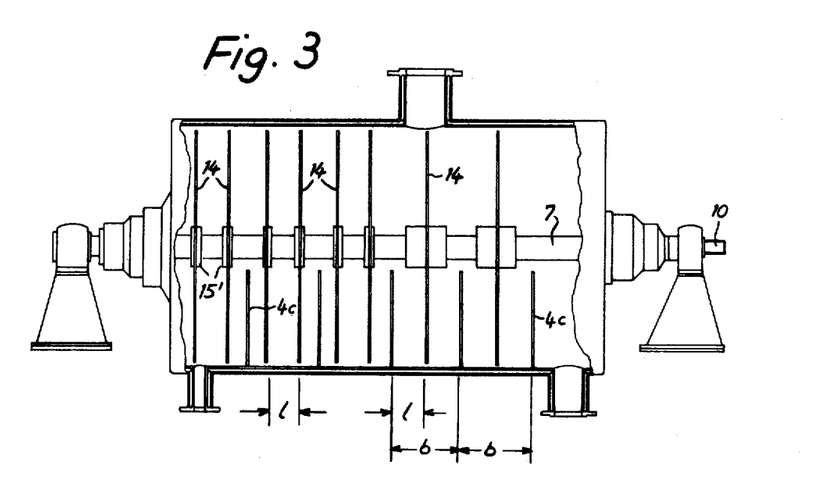
Figure 4:
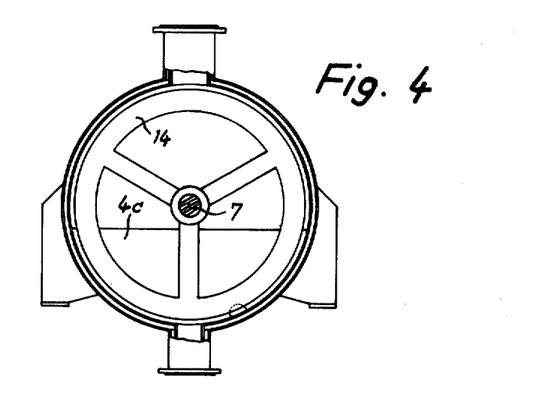
Figure 5:
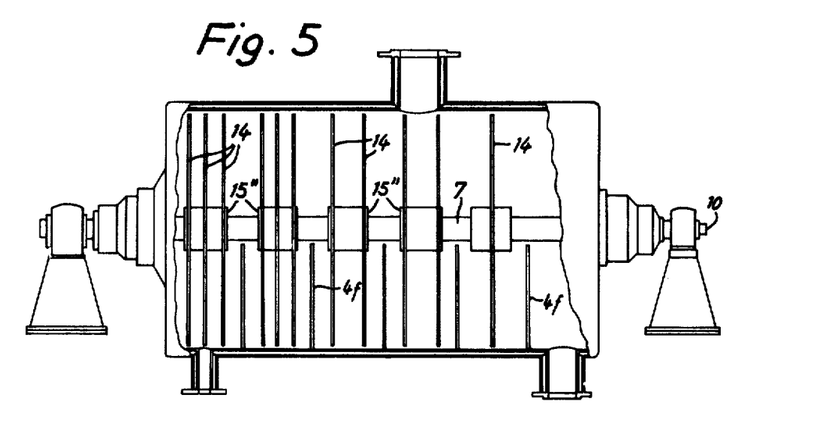
Figure 6:
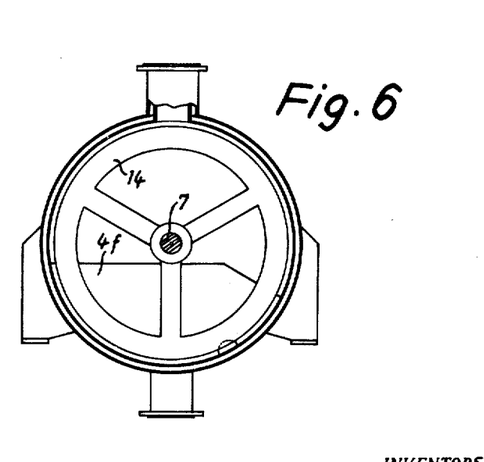

In particular, if the pre-condensate has low initial viscosity, it is advantageous to provide more annular discs 14 in the low-viscosity compartments, so as to increase the amount of films in the reaction chamber and the mixing effect in the bottoms. In the embodiment shown in FIGURES 3 and 4, the first three reaction compartments each have two annular discs 14, and the first two compartments in the device in FIGURES 5 and 6 have three discs 14, with two discs in the following two compartments. The examples in FIGURES 3 and 5 each have one disc in the higher-viscosity compartments, which are located near the outlet conduit 6. FIGURES 4 and 6 show partition walls 4c and 4f, respectively, which are different from each other and from those shown in FIGURE 2; both walls 4c and 4f terminate vertically below the middle of the container and this feature will be described in detail below. In the device in FIGURES 3 and 4, each annular disc is fastened to a hub 15', but in the device in FIGURES 5 and 6, each hub 15" bears two or three discs 14. It is not necessary to fasten each disc to sub 15" by spokes; for example, one disc can have spokes and the other discs can be fastened to the first disc by webs (not shown).

In the examples in FIGURES 1 to 6, the discs rotate with the same peripheral velocity, so that substantially coherent films are formed at each disc, even though the viscosity is different in the different compartments. As a further development of the invention, however, the increasing viscosity from one compartment to another can be compensated by arranging for the discs to have a lower peripheral velocity as the viscosity increases. This can be brought about either by varying the rotational speeds of the several discs within the reactor or by varying the disc diameters, or by a combination of the two methods.

Figure 7:
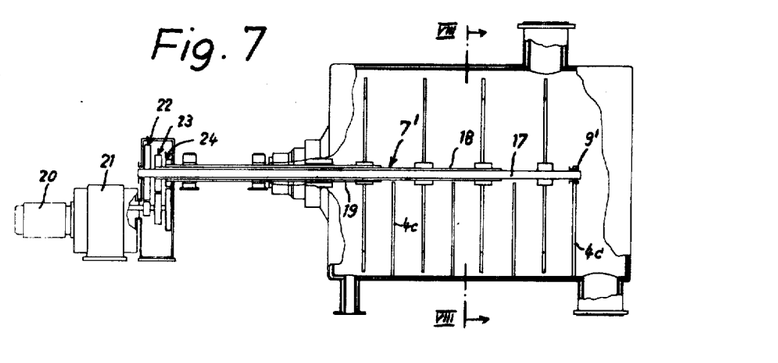
Figure 8:
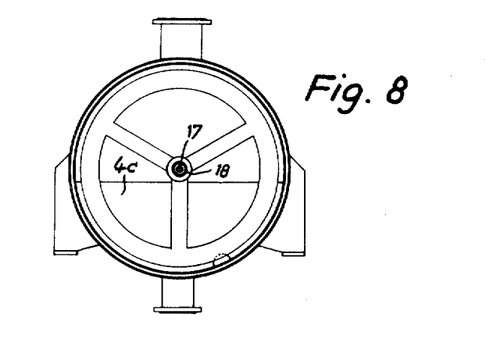

The method of varying the rotational speeds of the several discs is used in the device shown in FIGURES 7 and 8, in that the agitator shaft system 7' has discs of equal diameters on a shaft 17 and concentric hollow shafts 18 and 19. These shafts are driven at different speeds. The bearing 9' of agitator shaft system 7' is inside the container, though this is not necessary, and the bearing can be arranged in the manner described with reference to FIGURES 1 and 2. Of course, the bearing remote from the drive end can be disposed inside the container in all the embodiments. Shaft 17 and hollow shafts 18 and 19 are driven by an electric motor 20 via a variable speed gear 21 and pairs of gear-wheels 22, 23 and 24 with different transmission ratios. As can be seen, hollow shaft 19 has the fastest rotational speed and shaft 17 is the slowest. Partition wall 4c is shown in operation in FIGURE 8, which is a section along line VIII—VIII in FIGURE 7.

Figure 11:
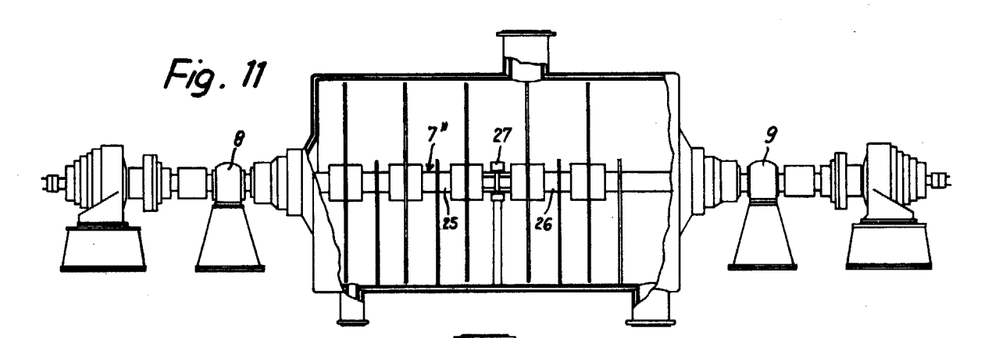
Figure 12:
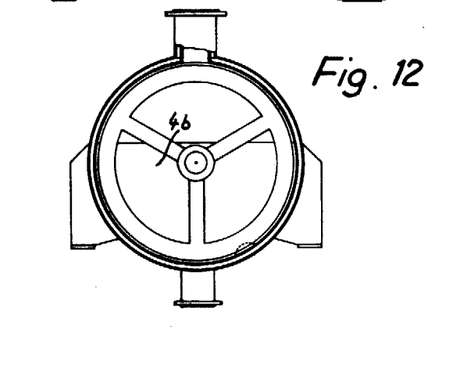

The device in FIGURES 11 and 12 shows an alternative method of compensating the increase in viscosity by varying the speed of rotation with the discs having the same diameter. In this case, however, the agitator shaft system 7" comprises two separate coaxial shafts 25 and 26 driven at different speeds from each end. Shaft 25 rotates faster than shaft 26. Each shaft has an external bearing 8 or 9 and a common internal bearing support 27. FIGURE 12 shows the construction of another type of partition wall 4b.

Figure 13:
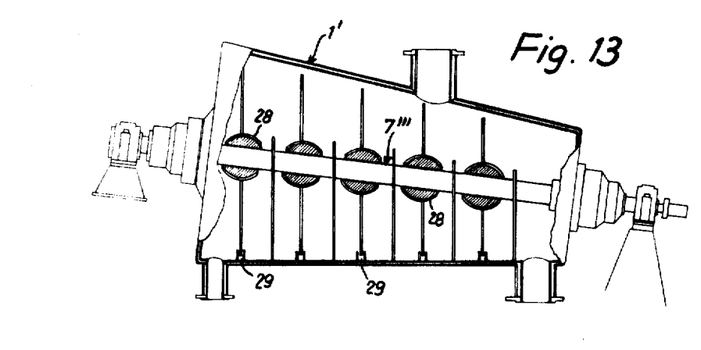
Figure 14:
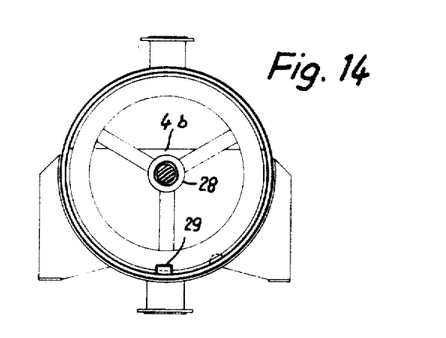

In the device according to FIGURES 13 and 14, the peripheral speed is graduated by varying the diameter of the discs; the double-walled jacket of container 1' has a frusto-conical configuration corresponding to the decreasing diameter of the discs, and the lower disc generatrix is horizontal to insure a uniform level of flow of material, with the result that the agitator shaft system 7''' is at an angle to the container axis. The discs are fastened to the agitator shaft by solidly-rotating ball joints 28 and are held perpendicular by stationary guide elements 29 which advantageously surround the annular discs like a fork. The advantage of this arrangement is that the agitator shaft system 7''' needs only one drive to rotate all of the annular discs to produce different peripheral velocities.

Figure 15:
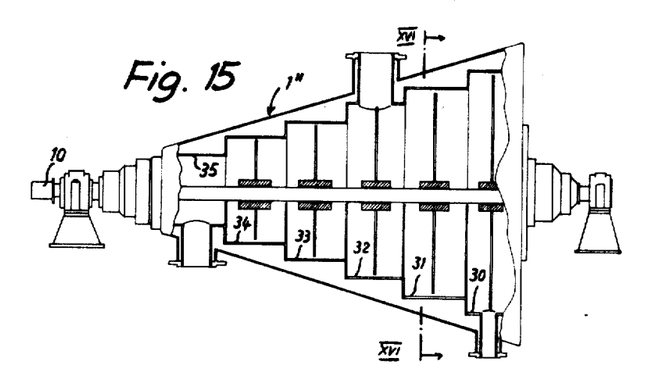
Figure 16:
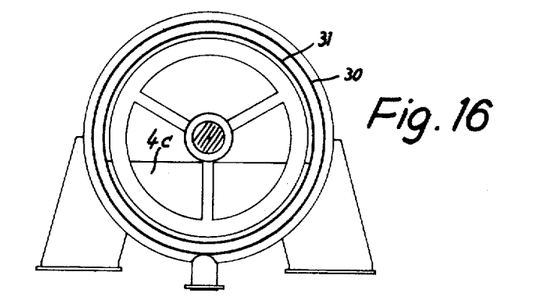
Figure 17:
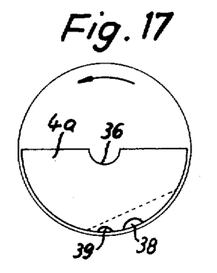
FIGURES 17–24 show various shapes of partition walls between the reaction compartments.

The same advantage is possessed by the variant in FIGURES 15 and 16, in which the internal wall of the double-walled jacket of container 1" is made of stepped cylindrical sections 30 to 35, inclusive, corresponding to the decrease in the diameter of the discs. The partition walls, which likewise are stepped in diameter, are disposed at the transitions between the steps. In the drawing, the reaction compartments corresponding to cylindrical sections 34 and 35 have different diameters, but this is not necessary, and the outlet zone can have the same diameter as cylindrical section 34. FIGURE 16, which shows the configuration of partition walls 4c, is a section along XVI—XVI in FIGURE 15.

Figure 21:
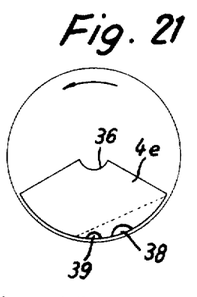
Figure 22:
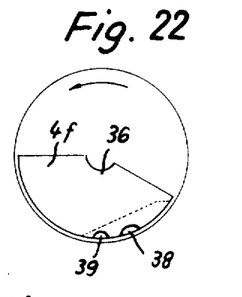
Figure 23:
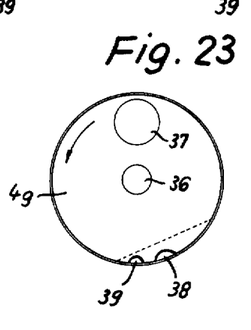
Figure 24:
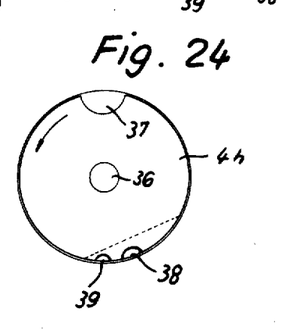
Figure 25:
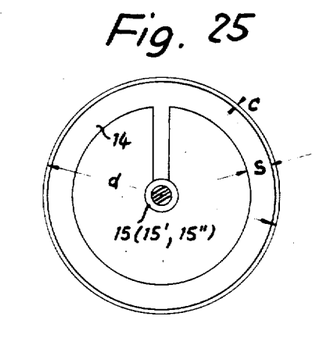
FIGURES 25–28 show some embodiments of the annular discs.
Figure 26:
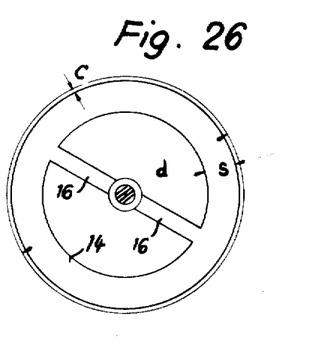
Figure 27:
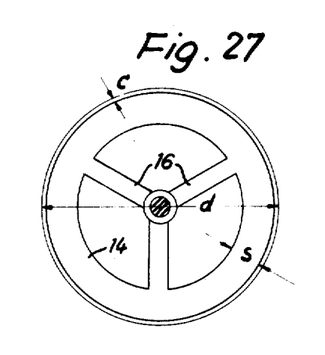
Figure 28:
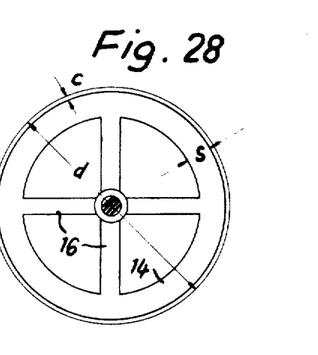

As FIGURES 17 to 20 show, the partition walls 4a, 4b, 4c and 4d can be segments of a circle with horizontal upper edges. In the embodiments in FIGURES 21 and 22, partition walls 4e and 4f are sectors of a circle. The walls 4g and 4h, on the other hand, are complete circles, as can be seen in FIGURES 23 and 24. Walls 4a, 4d, 4e and 4f terminate vertically in the middle of the vessel; wall 4b extends above the middle and wall 4c ends below the middle. In the first two cases, the walls are formed with openings 36 through which the agitator shafts pass. Walls 4g and 4h are formed with similar openings 36, and the upper parts of these walls are also formed with openings 37 to enable vapor to pass thorugh. Walls 4a to 4h all have an opening 38 for the product; since the bottom product is displaced in a direction shown by the arrow when the discs rotate, opening 38 is somewhat out of center. A further opening 39 can be formed in the middle of each partition wall, so that the apparatus can run empty. Openings 38 and 39 can alternatively be replaced by a single segment-shaped opening, as indicated by the dotted lines.

Figure 29:
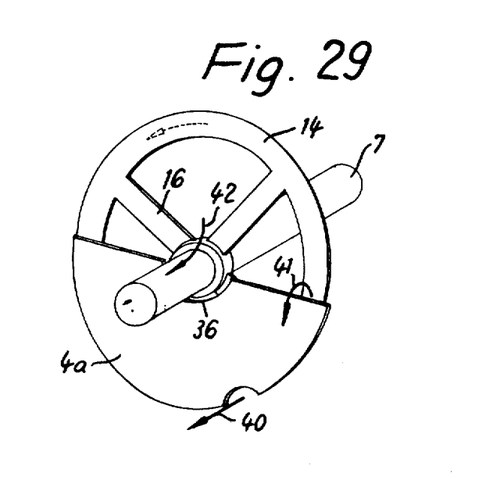
FIGURES 29 is a perspective view of a single partion wall and annular disc for showing the main paths along which the material can flow inside the device according to the invention.

As FIGURE 29 shows, the product in the reactor can be sent along three main paths if the partition walls have an appropriate shape. Arrow 40 indicates the path through openings 38, arrow 41 shows the path over the partition walls along the side where the product is lifted by the discs, and arrow 42 shows the path along the agitator shaft. If the walls are suitably shaped, the flow along the agitator shaft and over the partition walls can be reduced during continuous operation so that the material flows from one reaction compartment to another along a path with a definite cross-section. If the through-put and the type of reaction are known, the size of openings 38 and possibly 39 are the main factors determining the pressure loss required for free flow and consequently determining the extent to which compartments are filled and the residence time. The openings 39 may be advantageously made larger from one partition wall to another, in the direction of increasing viscosity.

As stated, the residence time can be regulated over a wider range by means of the level of the material in the last reaction compartment, which does not contain an agitator. To this end, it is an advantage for the product to flow mostly through openings 38 and possibly 39. If the residence time is varied over a smaller range, this may with advantage be done by altering the peripheral velocity of the discs. If, however, the dynamic viscosity varies between approximately 0.5 and 50,000 poises, the extent to which compartments are filled cannot be greatly varied by altering the speed of rotation, since care must be taken to insure that films are formed.

Partition walls 4c in the device in FIGURES 15 and 16,

The annular width $s$ of the discs should be from about 0.01 to 0.2 times the internal container diameter $d$;

The distance $c$ between the internal container wall and the discs should be about 0.01 or more times the internal container diameter $d$, and The distance $b$ (see FIGURE 3) between partition walls should be between about 0.1 and 0.4 times the internal container diameter $d$.

Distance $l$ (see FIGURE 3) between the discs in a which are suitable only for continuous operation, must not be formed with openings 38 or 39, so that the reacting material can be transported upwards along the container steps in the direction of arrows 41 and 42 (FIGURE 29).

FIGURES 25 to 28 show that discs 14 are fixed by one or more spokes 16 to hubs 15, 15' or 15''. It is preferred that not more than four spokes are attached to each disc, as otherwise the exposed area of film will be reduced.

To obtain the best material flow and reaction in the device according to the invention, it is important to observe the following conditions (cf. FIGURES 25 to 28): compartment or between the discs and the partition walls may be calculated from the following equation:

$$25(\text{mm.}) \leq l(\text{mm.}) \leq b/2(\text{mm.})$$

Figure 9:
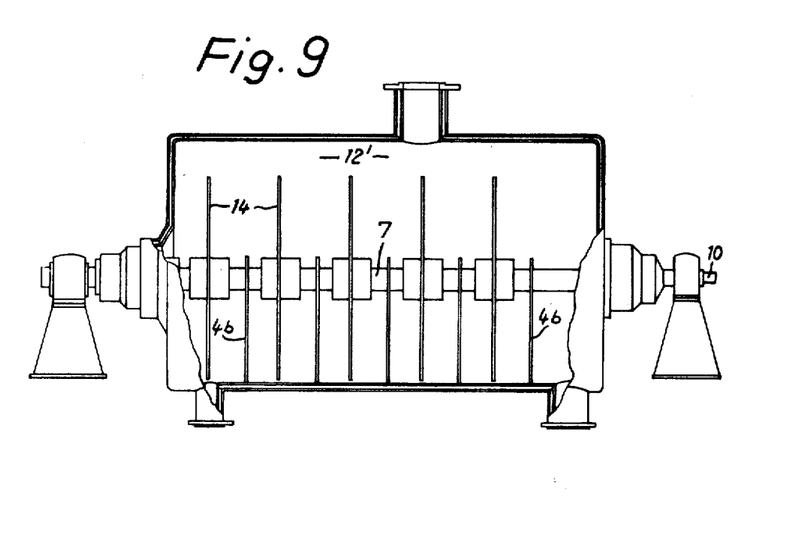
Figure 10:
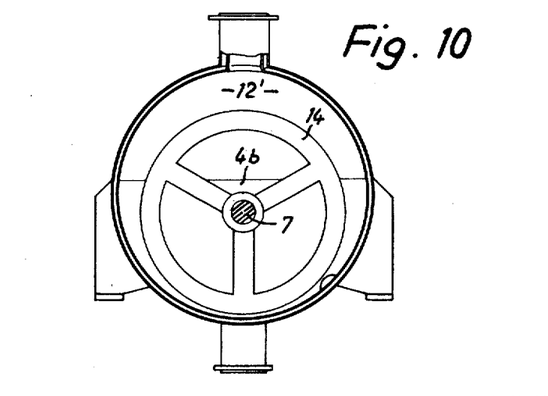

At high viscosities, it may be advantageous for the agitator shaft system 7 to be eccentric with respect to the container axis so that discs 14 come closest to the wall in the lower part of the container. This arrangement is shown in FIGURES 9 and 10. In this case, care is taken to insure that the vapor space 12' is above the discs, to prevent the formation of completely coherent films which might break up the vapor space at the compartment boundaries. In the devices described however, the same effect can be achieved by a trough-shaped vapor space extending outwards above the discs and extending along the whole length of the container (this is not shown in the drawings). Alternatively, the vapor space can be outside the container and connected by sleeves to each reaction compartment.

The polycondensation reaction according to the invention has produced the unexpected result that the residence time can be controlled within narrow limits without using special methods of forced flow. Reactors according to the invention have a very simple design and can be used to manufacture high-quality products in an economic manner. The process and apparatus according to the invention can be used to obtain ranges of residence times which are almost identical with those in ideal agitator cascades.

The method according to the invention and the preferred embodiments for working the method is or are suitable for general application to reactions in the liquid phase in which the dynamic viscosity varies between approximately 0.5 and 50,000 poises.

Sample tables will now be given, showing the manufacture of polyethylene terephthalate by polycondensation according to the invention. Examples I, II and III show the continuous processs and Example V shows batchwise operation. Example IV describes a comparative experiment made in a convention autoclave with agitator.

Examples I to III

Figure 18:
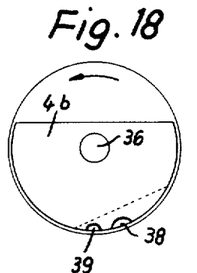
Figure 19:
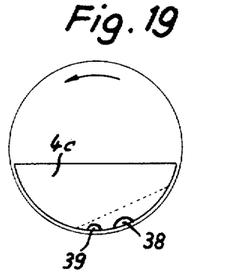
Figure 20:
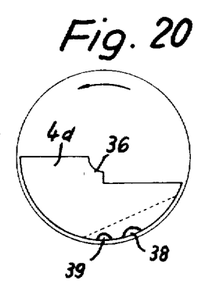

| | I | II | III |
|---|---|---|---|
| Throughput (kg./day) | 800 | 1,000 | 6,600. |
| Catalyst | Antimony triacetate. | Antimony triacetate. | Germanium dioxide. |
| Concentration of catalyst (wt. percent, referred to dimethyl-terephthalate). | 0.04 | 0.04 | 0.014. |
| Diameter of reactor $d$ (mm) | 700 | 700 | 1,300. |
| Number of stirred compartments. | 5 | 5 | 8. |
| Shape and arrangement of agitators in each compartment. | 3-2 annular disc, 2-1 annular disc. | 3-2 annular discs, 2-1 annular disc. | 3-2 annular discs, 5-1 annular disc. |
| Type of partition wall | Fig. 18 | Fig. 18 | Fig. 20. |
| Temperature of product at outlet (° C.). | 285 | 284 | 273. |
| Pressure (torr) | 0.8 | 1.6 | 2.5. |
| Average residence time (h.) | 3.0 | 2.0 | 1.6. |
| Speed of rotation (min.$^{-1}$) | 5 | 20 | 10. |
| Peripheral speed of agitator (m./sec.). | 0.18 | 0.72 | 0.67. |
| Intrinsic viscosity * inlet | 0.24 | 0.15 | 0.15. |
| Intrinsic viscosity * outlet | 0.8 | 0.5 | 0.45. |
| Ratio of $b$ to $d$ | 0.21 | 0.21 | 0.14. |
| Ratio of $s$ to $d$ | 0.114 | 0.114 | 0.077. |
| Number of spokes | 4 | 4 | 4. |

*Measured with a solvent mixture containing 2 parts phenol to 3 parts tetrachlorethane, 20°C., Ostwald viscosimeter.

The conditions in Example I were such that a product which could be immediately spun into high-quality filament was continuously ejected from the reactor outlet. In Examples II and III, the product had to undergo further polycondensation.

EXAMPLES IV AND V

Figure 1:
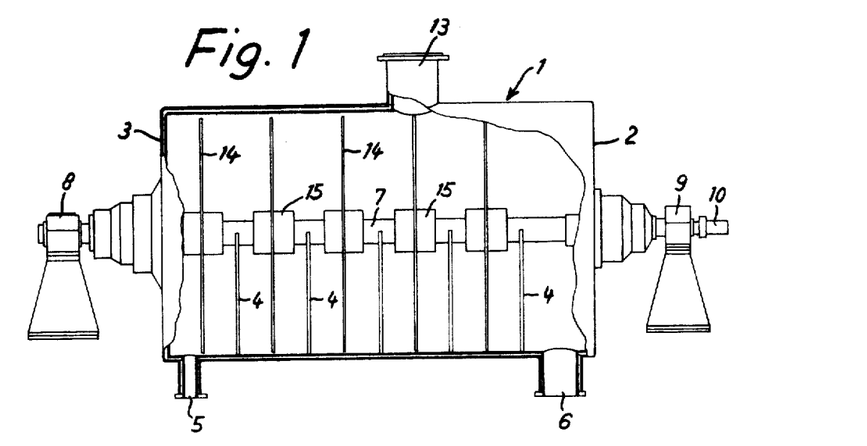
FIGURES 1–16 are longitudinal and cross-sections of various embodiments of the device for working the process according to the invention.
Figure 2:
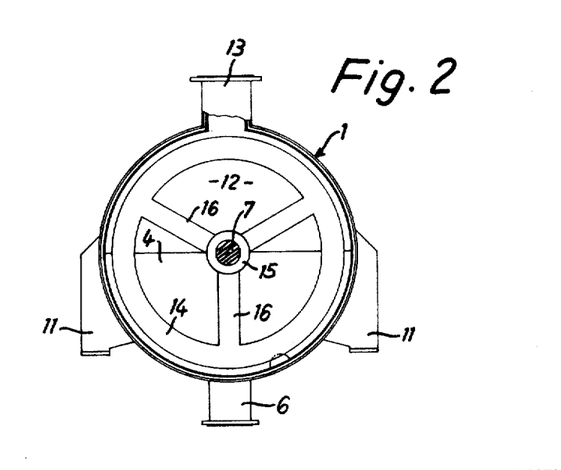

| | IV | V |
|---|---|---|
| Type of reactor | Vertical container with agitator. | Horizontal container with agitator, as in Figs. 1, 2. |
| Diameter of reactor (mm.) | 600 | 700. |
| Type of agitator | Spiral agitator on vertical shaft. | Annular discs as in Figs. 1, 2. |
| Temperature control (° C.) | Rising to 275° in 3 hrs., then constant at 275°. | At 270° for 1½ hrs., then at 275°. |
| Pressure control (torr) | Rising to 20 in 1 hr., then 0.2 to 0.5. | Rising to 20 in 1½ hrs. then 0.3 to 0.8. |
| Catalyst | Antimony triacetate. | Antimony triacetate. |
| Concentration of catalyst (wt. percent). | 0.04, 0.04, 0.07 | 0.04. |
| Height of reacting layer (mm.). | 350, 670, 350 | 267 (when the agitator was not switched on). |
| Speed of rotation of agitator (min.⁻¹). | 12, 12, 12 | 1,6 decreasing from 12 to 1 during the reaction. |
| Length of reaction (h.) | 7, 9.5, 7.5 | 7, 7, 7. |
| Intrinsic viscosity at outlet * | 0.69, 0.65, 0.74 | 0.7, 0.88, >0.9. |

*Measured with a solvent mixture containing 2 parts phenol to 3 parts tetrachlorethane, 20° C., Ostwald viscosimeter.

A comparison between the results in IV and V shows that, under similar reaction conditions, the process and apparatus according to the invention requires shorter residence times and gives considerably higher viscosity.

The invention has been described in detail with particular reference to preferred embodiments thereof, but it will be understood that variations and modifications can be effected within the spirit and scope of the invention as described hereinabove and as defined in the appended claims.

What is claimed is:

1. A process for the manufacture of linear high molecular weight polyethylene terephthalate by the condensation of liquid pre-condensates thereof comprising passing said pre-condensates as the reacting material into a reaction chamber, maintaining said chamber at reaction conditions for condensing said material, repeatedly forming said reacting material into freely falling films to expose large surface areas of said material to said reaction conditions.

2. A process according to claim 1 wherein said freely falling films are formed by continuously lifting liquid reacting material from the bottom of said chamber.

3. A process according to claim 1 further comprising providing a vacuum in said reaction chamber for the removal of gaseous reaction products.

4. A process according to claim 1 wherein said reacting material is passed through said chamber in one direction said freely falling films are formed by lifting the reacting material from the bottom of the chamber in a plane substantially normal in said one direction, and the speed at which the material is lifted is decreased in the direction of travel of said reacting material.

5. A process for the manufacture of linear high molecular weight polyethylene terephthalate by condensation of viscous liquid precondensates thereof comprising charging said precondensates as the reacting material into a reaction chamber to provide a mass of said material within said chamber, maintaining said chamber at reaction conditions for condensing said material, repeatedly lifting a portion of said reacting material from said mass to a point above the mass, forming said portion into a thin film exposed on both sides to the reaction conditions, permitting said film to fall under the force of gravity whereby further large surface areas of said material are exposed to thereby accelerate the condensation reaction.

6. A process according to claim 5 wherein successive portions are formed into a substantially continuous film.

7. A process according to claim 5 wherein said portion is lifted in a substantially vertical direction.

8. A process according to claim 5 wherein said portion is taken from that part of said mass which is near to the walls of said chamber.

9. A process for the manufacture of linear high molecular weight polyethylene terephthalate by polycondensation of viscous liquid precondensates thereof comprising:
  (a) charging said precondensates as the reacting material into a reaction chamber to provide a mass of said material within said chamber which fills the chamber to a predetermined level when said mass is quiescent, said chamber being provided with an elongated supporting surface spaced at a predetermined distance above said level
  (b) maintaining said chamber at reaction conditions for condensing said material
  (c) continuously lifting a portion of said reacting material from said mass
  (d) forming said portion at said supporting surface into a film exposed on both sides to the reaction conditions
  (e) permitting said film to fall freely in space for at least a major portion of the distance between said support and said predetermined level, whereby in falling said distance large surface areas of said material are exposed to thereby accelerate the condensation reaction.

10. A process for the manufacture of linear high molecular weight polyethylene terephthalate by polycondensation of viscous precondensates thereof comprising:
  (a) charging said precondensates as the reacting material into a reaction chamber to provide a mass of said material within said chamber which fills the chamber to a predetermined level when said mass is quiescent, said chamber being provided with at least one substantially annular disc therein whereby the viscous reacting material adheres to the flat surface of said disc
  (b) maintaining said chamber at reaction conditions for condensing said material
  (c) continuously rotating said disc to lift a portion of said material from said mass to a point above the mass
  (d) permitting the material adhering to said disc to fall freely in space in the form of thin films for at least the distance from the annular disc to the axis thereof whereby said film in falling said distance becomes increasingly thinner to expose further large surface areas of said material to thereby accelerate the condensation reaction.

References Cited

UNITED STATES PATENTS

| 2,869,838 | 1/1959 | Ryder | 259—9 |
| 3,057,702 | 10/1962 | Pierce et al. | 23—285 |

HAROLD D. ANDERSON, Primary Examiner

U.S. Cl. X.R.

23—274; 260—95